(12) United States Patent
Huang et al.

(10) Patent No.: US 7,464,186 B2
(45) Date of Patent: *Dec. 9, 2008

(54) METHOD AND SYSTEM FOR SERVER SYNCHRONIZATION WITH A COMPUTING DEVICE VIA A COMPANION DEVICE

(75) Inventors: Xiaofei Huang, Foster City, CA (US); Magnus Vejlstrup, San Francisco, CA (US); Anupam Singhal, Union City, CA (US); Pi-Yu Chung, Bellevue, WA (US); David L. Rabbers, Newcastle, WA (US); Martin Susser, University Place, WA (US)

(73) Assignee: Siebel Systems Inc., San Mateo, CA (US)

( * ) Notice: Subject to any disclaimer, the term of this patent is extended or adjusted under 35 U.S.C. 154(b) by 470 days.

This patent is subject to a terminal disclaimer.

(21) Appl. No.: 10/982,649

(22) Filed: Nov. 5, 2004

(65) Prior Publication Data

US 2007/0198743 A1 Aug. 23, 2007

Related U.S. Application Data

(63) Continuation of application No. 10/119,507, filed on Apr. 9, 2002, now Pat. No. 6,829,655, which is a continuation of application No. 09/820,516, filed on Mar. 28, 2001, now abandoned.

(51) Int. Cl.
    *G06F 15/16* (2006.01)
(52) U.S. Cl. .................. 709/249; 709/242; 707/101; 707/201

(58) Field of Classification Search .................. 709/203, 709/223, 248, 219, 229; 707/210, 10, 1, 707/103, 101
See application file for complete search history.

(56) References Cited

U.S. PATENT DOCUMENTS

| | | | |
|---|---|---|---|
| 5,640,566 | A | 6/1997 | Victor et al. |
| 5,831,664 | A | 11/1998 | Wharton et al. |
| 5,857,201 | A | 1/1999 | Wright, Jr. et al. |
| 5,862,327 | A | 1/1999 | Kwang et al. |
| 5,867,688 | A | 2/1999 | Simmon et al. |
| 5,924,096 | A * | 7/1999 | Draper et al. ................. 707/10 |
| 5,974,238 | A | 10/1999 | Chase |
| 5,978,813 | A * | 11/1999 | Foltz et al. .................. 707/201 |
| 5,991,771 | A | 11/1999 | Falls et al. |
| 6,000,000 | A | 12/1999 | Hawkins et al. |
| 6,026,165 | A * | 2/2000 | Marino et al. ............... 380/273 |

(Continued)

FOREIGN PATENT DOCUMENTS

WO PCT/US02/09161 5/2002

(Continued)

*Primary Examiner*—Thong H Vu
(74) *Attorney, Agent, or Firm*—Campbell Stephenson LLP (57) ABSTRACT

The A method and system for server synchronization with a computing device via a companion device is disclosed. In one embodiment, the method comprises synchronizing a device and an enterprise server via a companion device, which comprises retrieving a record extraction sequence from the server; providing the record extraction sequence to the handheld device from the companion device; and extracting records stored on a database according to the record extraction sequence, wherein the extracted records are not already stored on the computing device.

20 Claims, 4 Drawing Sheets

Companion Server Sync

U.S. PATENT DOCUMENTS

| | | | |
|---|---|---|---|
| 6,128,656 A * | 10/2000 | Matchefts et al. | 709/223 |
| 6,189,011 B1 | 2/2001 | Lim et al. | |
| 6,205,448 B1 | 3/2001 | Kruglikov et al. | |
| 6,212,529 B1 | 4/2001 | Boothby et al. | |
| 6,216,135 B1 | 4/2001 | Brodersen et al. | |
| 6,226,650 B1 * | 5/2001 | Mahajan et al. | 707/201 |
| 6,233,577 B1 | 5/2001 | Ramasubramani et al. | |
| 6,233,617 B1 | 5/2001 | Rothwein et al. | |
| 6,269,369 B1 | 7/2001 | Robertson | |
| 6,272,545 B1 | 8/2001 | Flanagin et al. | |
| 6,295,541 B1 | 9/2001 | Bodnar et al. | |
| 6,317,797 B2 | 11/2001 | Clark et al. | |
| 6,330,715 B1 | 12/2001 | Razzaghe-Ashrafi | |
| 6,374,245 B1 | 4/2002 | Park | |
| 6,493,727 B1 * | 12/2002 | Huang et al. | 707/201 |
| 6,505,214 B1 * | 1/2003 | Sherman et al. | 707/201 |
| 6,532,480 B1 * | 3/2003 | Boothby | 707/201 |
| 6,581,074 B1 * | 6/2003 | Wong et al. | 707/201 |
| 6,606,649 B1 | 8/2003 | Schwitters et al. | |
| 6,611,849 B1 | 8/2003 | Raff et al. | |
| 6,636,873 B1 | 10/2003 | Carini et al. | |
| 6,721,787 B1 | 4/2004 | Hiscock | |
| 6,785,706 B1 * | 8/2004 | Horman | 709/203 |
| 6,820,088 B1 * | 11/2004 | Hind et al. | 707/101 |
| 6,928,467 B2 * | 8/2005 | Peng | 709/219 |
| 7,024,430 B1 * | 4/2006 | Ingraham et al. | 707/201 |
| 7,069,433 B1 * | 6/2006 | Henry et al. | 713/151 |
| 7,092,969 B2 * | 8/2006 | Meek et al. | 707/104.1 |
| 7,139,838 B1 * | 11/2006 | Squire et al. | 709/242 |
| 2002/0046286 A1 * | 4/2002 | Caldwell et al. | 709/229 |
| 2003/0069874 A1 * | 4/2003 | Hertzog et al. | 707/1 |
| 2003/0084017 A1 * | 5/2003 | Ordille | 707/1 |
| 2003/0233370 A1 * | 12/2003 | Barabas et al. | 707/103 R |
| 2004/0098619 A1 * | 5/2004 | Shay | 713/201 |
| 2005/0071358 A1 * | 3/2005 | Hind et al. | 707/101 |

FOREIGN PATENT DOCUMENTS

| | | |
|---|---|---|
| WO | WO 02/080015 | 10/2002 |
| WO | PCT/US03/05753 | 5/2003 |

* cited by examiner

METHOD AND SYSTEM FOR SERVER SYNCHRONIZATION WITH A COMPUTING DEVICE VIA A COMPANION DEVICE

The present patent application is a continuation of prior application Ser. No. 10/119,507, filed on Apr. 9, 2002 now U.S. Pat. No. 6,829,655, entitled "METHOD AND SYSTEM FOR SERVER SYNCHRONIZATION WITH A COMPUTING DEVICE VIA A COMPANION DEVICE," which is a continuation of prior application Ser. No. 09/820,516, filed on Mar. 28, 2001 now abandoned, entitled "METHOD AND SYSTEM FOR SERVER SYNCHRONIZATION WITH A COMPUTING DEVICE VIA A COMPANION DEVICE."

FIELD OF THE INVENTION

This invention relates to computer systems, and more specifically to a method and system for server synchronization with a computing device via a companion device.

BACKGROUND OF THE INVENTION

Palm or handheld computers have offered very limited functionality and have been restricted to being personal organizers. These watered-down computers are not compatible with programs on larger desktop and notebook computers, but rely on proprietary operating systems and programs to ensure small memory footprint and quick response time, even on low-power microprocessors. These restrictions have limited the usefulness of the personal organizers, as they operate stand alone and cannot readily share data with other computers.

Some handheld devices are capable of interacting with enterprise business applications running remotely on enterprise servers via a network, such as the internet. The two platforms were linked via one or more communication paths usually through a host server, including paths through a modem, a parallel port, a serial port, or a cradle assembly. Further, various wireless communication techniques, such as radio or infrared communication may be used. In the event that a cradle was used, when the handheld computer was in the cradle and actively connected to the host computer, the handheld computer typically entered a mode to update data in the host computer and itself.

A major problem exists in the current methods of synchronizing data between the enterprise server and the palmtop or handheld computer. For instance, certain data such as calendar information, appointment information, and notes, among others, would generally be kept on the server, which may be networked so that other handhelds or workstations may remotely update the calendar information, appointment information, and notes. The same information was also kept on the palmtop or handheld computer for the user to review and update when mobile. However, if the user was traveling and information was entered on the server or on a remote station on a network server machine while the user was not at his or her office, or if the user entered information on the local version of the data in the palmtop or handheld computer, the information contained in the server and the palmtop or handheld computer would become non-coherent, leading to undesirable problems such as meeting conflicts and miscommunications.

Prior art methods synchronize a list of records, such as contact and appointments. They are not shared among different users and/or user accounts and are only visible to the owner and can only be modified buy the owner.

Some enterprise applications can handle very complex data for enterprises targeted for different areas, such as Field Service and Sales Force Automation, and more. The data models in applications are much more rich than those which can be represented by list of records. Plus, the data may have the following visibilities:

1) Visible only to a particular position (each person may have one or more positions in an organization),
2) Visible to a group of persons, such as the persons in the same sales team, or in the same account team,
3) Visible to management positions,
4) Visible to a particular organization in a company,
5) Visible across all organizations in a company.

The change in the visibility of a particular piece of data leads to the changes of the scope of people who can see and change it. If more than one person can change it, the prior art methods of synchronization failed to keep the data coherency among all the persons who can see and modify it.

The prior resolutions of the data synchronization problem were generally very time consuming and tedious and therefore reduced the effectiveness of the palmtop/desktop combination. One solution was to limit the accessibility of files such that only files physically residing with the user were the master. However, this solution dictated that no changes could be made to the other system without the danger of losing those changes. Thus, while the palmtop/desktop combination of computers existed, the use of the combination was not popular due to the requirement that the user had to manually synchronize the data on both platforms. Therefore, the problem of synchronization limited the potential of the palmtop or handheld computer market.

One problem encountered by the current generation of handheld devices and their add-on connectivity solutions is that the connectivity solutions rely on batch mode rather than real-time oriented approaches to data coherency. Because the server and the handheld device typically became disconnected and incommunicado when the user goes mobile, the data synchronization problem becomes intractable. During the mobile period, the creation, the deletion and the modification of data causes incoherency that often results in conflicts reconcilable only through manual intervention by the user. These conflicts would arise because the server and handheld device were unable to communicate changes in their data until they were reconnected using a serial, parallel or modem connection.

Most handhelds are connected to the network through a cradle connected to a desktop or laptop computer. Synchronization in prior art systems usually involves synchronizing the desktop or laptop with the server and then synchronizing the handheld with the desktop or laptop. This is especially inefficient if the user desires to synchronize the handheld with the server without synchronizing with the desktop or laptop.

SUMMARY OF THE INVENTION

In one embodiment, the method comprises synchronizing a computing device and an enterprise server via a companion device, which comprises retrieving a record extraction sequence from the server; providing the record extraction sequence to the computing device from the companion device; and extracting records stored on a database according to the record extraction sequence, wherein the extracted records are not already stored on the computing device.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

A method and system for direct server synchronization with a handheld device is disclosed. In one embodiment, the method comprises synchronizing directly a handheld device and an enterprise server, which comprises retrieving a record extraction sequence from the server; and extracting records stored on a database according to the record extraction sequence, wherein the extracted records are not already stored on the handheld device.

In the following description, for purposes of explanation, specific nomenclature is set forth to provide a thorough understanding of the present invention. However, it will be apparent to one skilled in the art that these specific details are not required in order to practice the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
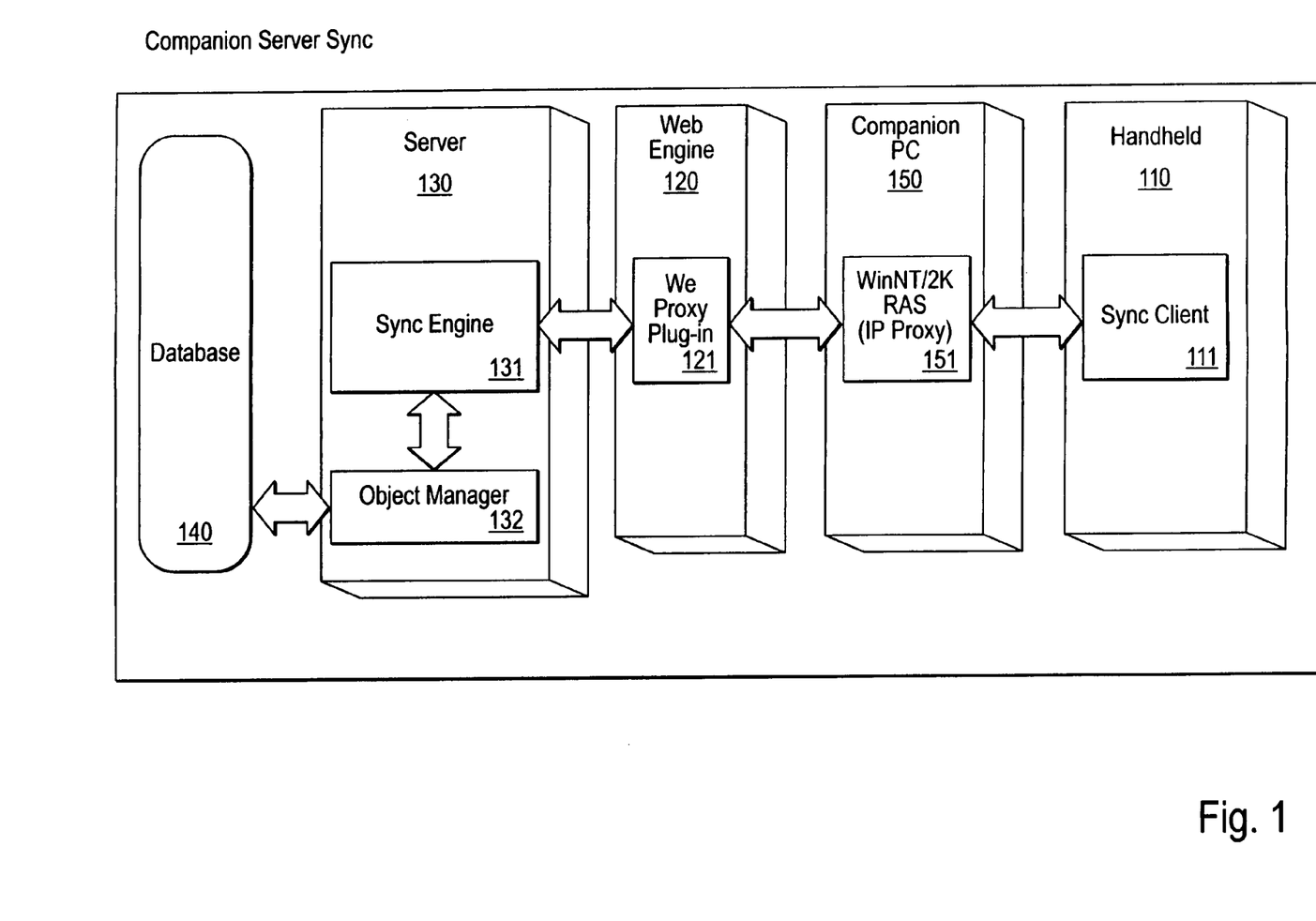
FIG. 1 illustrates a block diagram of a server synchronization system 100 using a companion device.

FIG. 1 illustrates a block diagram of a server synchronization system 100 using a companion device. System 100 includes handheld device 110. The present method and system is not limited to handheld device 110. It may be applied for the direct server synchronization of computing machines, like personal computers and laptops as well. Handheld 110 could be a Palm™ operating system device such as those manufactured by Palm, Inc. of Santa Clara, Calif., or a Microsoft CE™ operating system device, such as those manufactured by Casio, Inc. of Dover, N.J., or similar Palm and CE devices. Included in handheld 110 is synchronization client 111 (Sync Client). Sync client 111 a) provides a user with a synchronization interface
b) interfaces with modules, such as a handheld database generator, a handheld transaction manager, and a data integrity manager;
c) completely rollsback transactions after the previous synchronization;
d) imports the net changes downloaded to handheld 110 so that the local data model on sync client 111 reaches the same state as that of database 140;
e) sends log off requests to server 130;
f) sends a request to server 130 for a device ID if it is the first time handheld 110 is synchronized with a server 130;
g) sends its device ID to server 130 if it has previously synchronized with server 130; and
h) sends a request to server 130 to download application definitions (meta-data) if it is the first synchronization, there are meta-data updates caused by responsibility changes, server 130 upgrades the application with new meta-data, or meta-data is missing on sync client 111.

Each device 110 synchronizing with a server 130 hosting an enterprise application has an unique ID. Server 130 uses the device ID to determine performance requirements, security and licensing management.

Web Engine (WE) 120 is coupled to handheld 110. WE 121 includes a WE proxy plug-in 121. Plug-in 121 is a Hyper Text Transport Protocol (HTTP) extension which translates HTTP requests to a different networking protocol, such as SISNAPI. SISNAPI is a protocol operating on top of TCP/IP, which is similar to HTTP, but provides additional performance in data transport, security, and scalability.

Server 130 is connected to WE 120 and may be an enterprise server running enterprise applications or similar server.

Server 130 includes a synchronization engine 131 (Sync Engine) which communicates with plug-in 121. Sync Engine 131 a) handles requests for logging-in and logging-out from sync client 111,
b) uploads transactions from handheld 110 and processes those transactions;
c) extracts records for business components from database 140;
d) packs and sends records to handheld 110;
e) generates a digital signature for checking synchronization integrity; and
f) Finds the net changes of the sync client 111 based on its synchronization history.

Sync Engine 131 includes a server sync manager (SSM). SSM is comprised of many sub-managers, including a transaction processing manager, a report manager, a data extraction manager, a transaction history manager (THM), a user profile manager (UPM), a conflict resolution manager (CRM), a meta-data sync manager (MSM), and a sync visibility manager (SVM).

The transaction processing manager parses the transactions sent from SSM and executes the transactions one-by-one. The report manager reports conflicts, transaction errors, and synchronization results. The data extraction manager accepts requests for extracting raw data, and packs the data into a text file in the form of an object. The object is defined by a universal object locator which uniquely identifies each object.

The data extraction manager manages the integrity and consistency of synchronized raw data. THM stores a transaction history and compares the results for each sync session. THM stores the results and works with the report manager and data extraction manager.

UPM manages user profiles, such as usernames, application names, device, object manager names, and sync-filters used by the user. CRM cooperates with report manager and the transaction processing manager to ask for feedback and confirmation when conflicts occur.

MSM extracts meta-data (such as screen, view, and field definitions) and packs the meta-data into a XML format. The meta-data is stored locally in server 130. Additionally, MSM monitors the consistency and integrity of meta-data between server 130 and handheld 110. MSM supports repository upgrades, and monitor's responsibility changes that lead to meta-data updates.

The SVM applies rules for cutting down the amount of data synchronized between server 130 and handheld 110.

Server 130 also includes object manager 132 which loads objects in and out of database 140. Also included in system 100 is database 140. Database 140 may be a relational database, such as an Oracle™ database, or similar storage device.

System 100 includes a companion PC 150. Companion PC 150 may be a desktop or laptop computing device. Companion PC 150 serves as an intermediate connection between handheld 110 and server 130. For example, companion PC 150 could be a laptop connected to a LAN and handheld 110 is then plugged into companion PC 50. With the present method and system a user may synchronize his/her handheld 110 with server 130 via PC 150.

Companion PC 150 includes an Internet Protocol (IP) Proxy 151. IP Proxy 151 is compatible with Microsoft Windows NT™, Windows 2000 and RAS operating systems. Companion PC 150 includes certain software to enable the synchronization of handheld 110 and server 130, such as:

(a) an event viewer;
(b) a synchronization manager;
(c) a user interface;
(d) file exchange support via the user interface;
(e) a progress and status user interface; and
(f) a remote launcher for synchronization modules.

System 100 allows handheld 110 to synchronize directly with server 130, over the internet, serial connection dial-up, Ethernet, infrared wireless, or other similar network, including enterprise data having multiple relationships. The present system and method resolves conflicts between server 130 and handheld 110 that occur during synchronization. The present techniques ensure synchronized data is reliable on both handheld 110 and server 130.

Figure 2A:
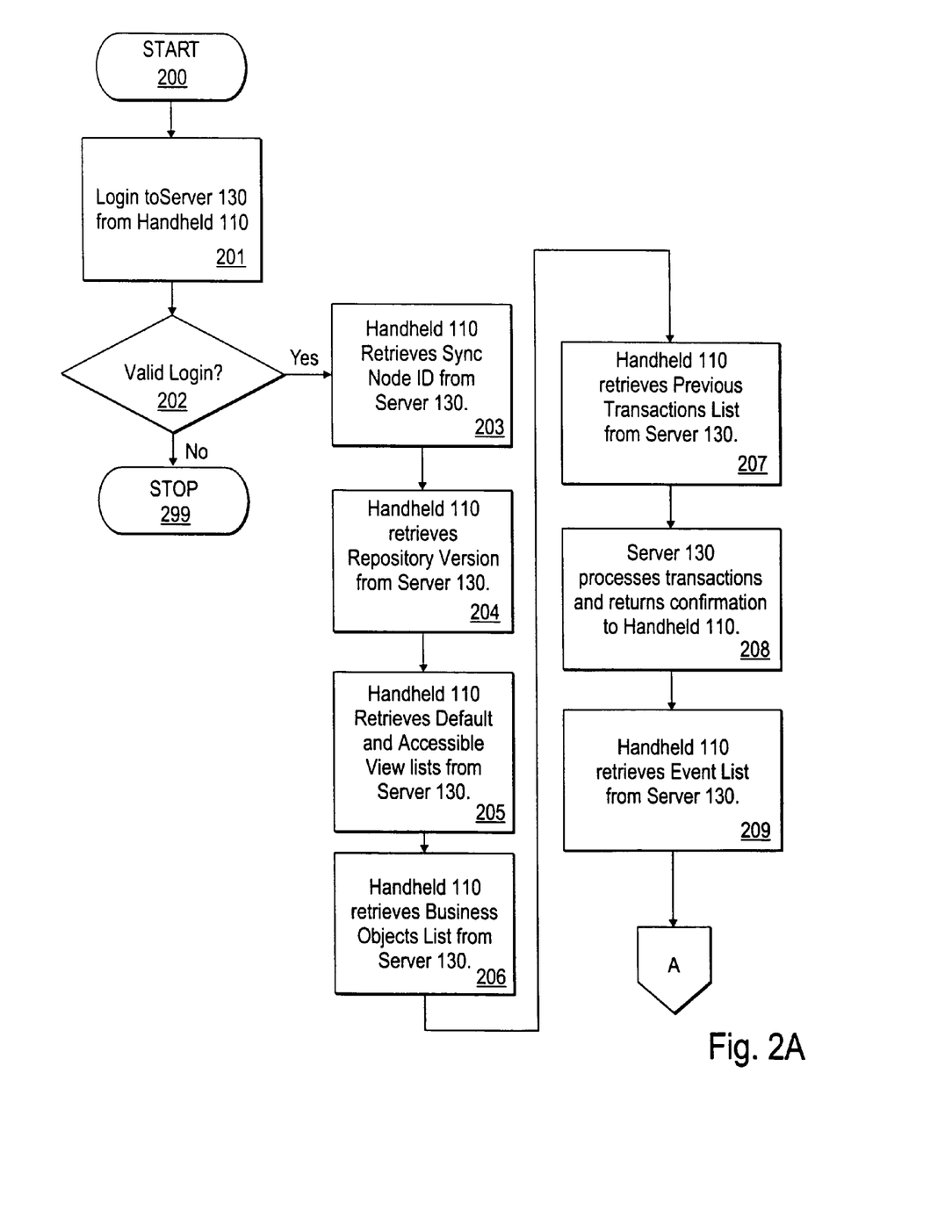
FIGS. 2A and 2B illustrate an exemplary flow diagram of the data exchange between handheld 110 and server 130 via companion device 150 and web engine 120 for server 130 synchronization with handheld 110.
Figure 2B:
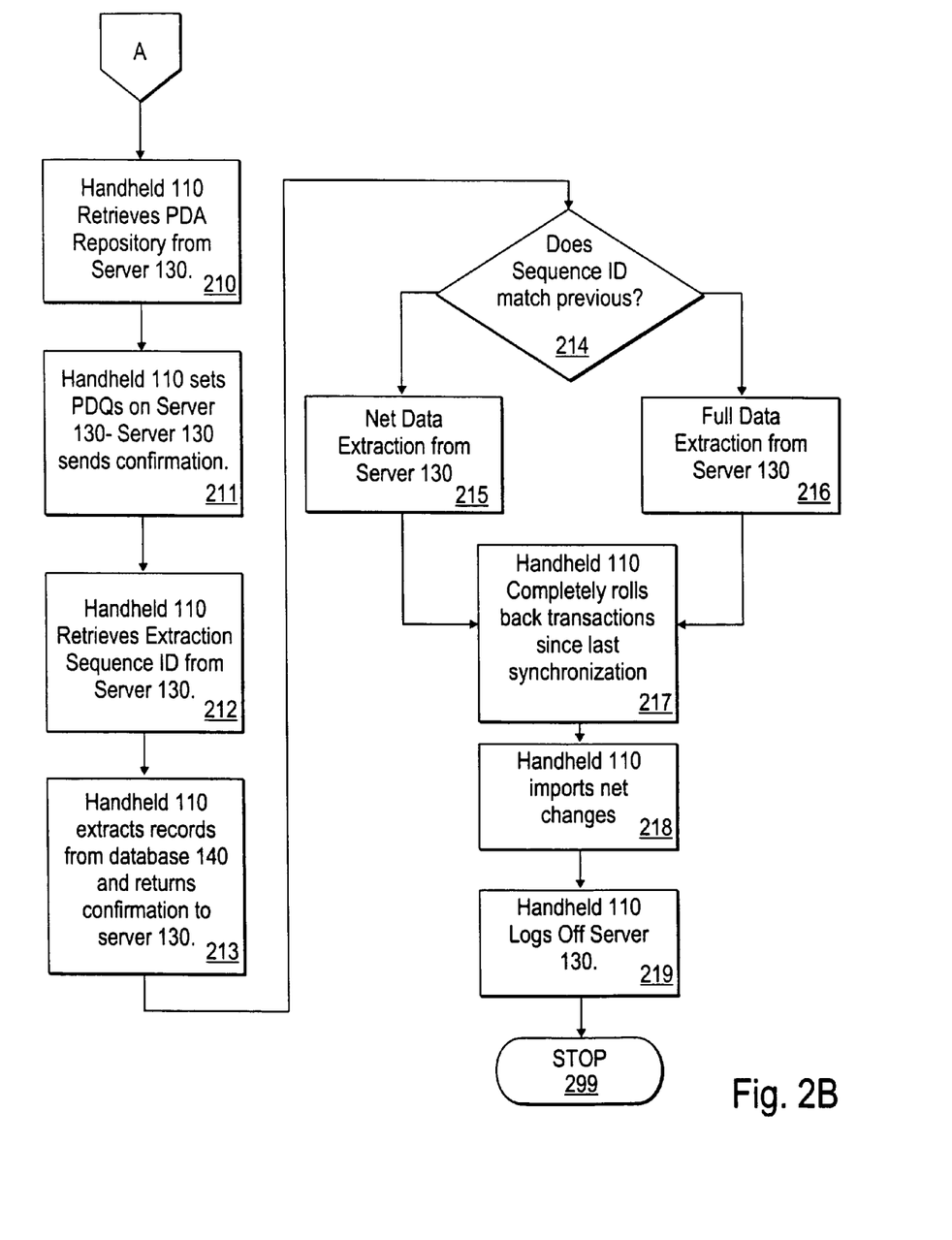

FIGS. 2A and 2B illustrate an exemplary flow diagram of the data exchange between handheld 110 and server 130 via companion device 150 and web engine 120 for server 130 synchronization with handheld 110. Blocks 201-299 describe the ultimate data exchange between server 130 and handheld 110, although it is contemplated that companion PC 150 serves as a proxy between handheld 110 and server 130. Companion PC 150 possesses the functionability described above in order to allow synchronization of handheld 110 and server 130 via companion PC 150, without first having to synchronize companion PC 150 with server 130. The process begins at start block 200. At processing block 201 handheld 110 logs-in to server 130. Logging-in may be initiated by the user selecting a synchronization button on handheld 110. At decision block 202, server 130 confirms that handheld is allowed access to server 130. If the login is not valid, then flow ends at stop block 299. If the login is valid, flow continues to processing block 203.

Handheld 110 retrieves a synchronization identifier (Sync ID) from server 130, at block 203. The sync ID is a unique identifier assigned to handheld 110. No two devices across the enterprise will have the same sync ID. The sync ID is never reused, reassigned, or recycled. Finally, the sync ID is stored on handheld 110. Flow continues to processing block 204.

Handheld 110 requests and retrieves a repository version number or code from server 130. The repository version allows handheld 110 to determine if it needs to synchronize by comparing the repository version with a locally stored repository version retrieved from its previous sync session. At processing block 205, handheld 110 retrieves views from server 130. A view is a special display of data, created as needed. A view temporarily ties two or more files together so that the combined files can be displayed, printed or queried. All accessible views and default views for the user of handheld 1 10 are retrieved.

Default views specify views in an application to be synchronized and transferred to handheld 110. Applications running on handheld 110 may share common application definitions with those running on other platforms, such as desktops and laptops. Default views provide a way to limit the volume of data transferred to handheld 110.

Furthermore, default views specify all the views that server 130 will extract from database 140 and download and synchronize with handheld 110. Each view has one business object associated with it. Each view may have a number of applets and each applet has a business component associated with it.

Accessible views specify the views that a particular user account can see. It is controlled by responsibilities (a processing step performed by an object). Each user account can have one or more responsibilities. And each responsibility has a number of assigned views, which can be configured by an application. The accessible view list further limits the views at handheld 110.

Default Business Object lists specify all the extra data used by handheld 110 at the application level and/or special customization of business logics at the business component level.

PDQ views result from PDQs that serve as synchronization filters to limit the volume of data transferred to handheld 110. PDQs are defined by a system administrator.

Flow continues to processing block 206 where handheld 110 retrieves a list of business objects from server 130. If any objects in the list are missing from handheld 110, they are retrieved from server 130.

At processing block 207, handheld 110 retrieves a list of previous transactions from server 130. The previous transactions list lists the transactions previously synchronized on handheld 110. Handheld 110 retrieves the list of previous transactions from server 130 to verify if server 130 in fact received it. Handheld 110 stores the list locally in case the local list is different from that retrieved from server 130. It implies that server 130 does not completely receive and handheld 110 should send the list of previous transactions again to server 130. Afterwards, handheld 110 will retrieve the transactions from a local database, pack the transactions, and use them to replace the local list. This will be used in the next synchronization session and sent to server 130.

With the list, handheld 110 may determine which transactions need to be processed. Flow continues to processing block 208, where server 130 processes any necessary transactions, determined in processing block 207. Each transaction is processed individually and a confirmation is sent to handheld 110 for each transaction, until all transactions are processed.

At processing block 209, handheld 110 retrieves an event list from server 130. The event list allows handheld 110 to synchronize all events that occurred since the last synchronization with server 130. Flow continue to processing block 210 where handheld 110 retrieves the PDA repository from server 130. A repository upgrade and responsibility change may detected. If the repository is upgraded, a new PDA master repository is downloaded from handheld 110 to server 130. On server 130, the PDA repository will be regenerated based on the new PDA repository.

At processing block 211, handheld 110 sets PDQs on server 130. Thus, once server 130 sends handheld 110 a confirmation, the PDQs are synchronized on both sides. Flow continues to processing block 212 where handheld 110 retrieves an extraction sequence ID from server 130. The extraction sequence ID allows handheld 110 know which database records need to be extracted form database 140 in order to be synchronized with server 130.

Flow continues to processing block 213 where handheld 110 extracts necessary records from database 140 and returns a confirmation to server 130. At decision block 214, handheld 110 determines if the Extraction Sequence ID obtained at processing block 212 matches the previously obtained Extraction Sequence ID. If the Sequence IDs match, then flow continues to processing block 215. If the Sequence IDs do not match, then flow continues to processing block 216. At processing block 215 handheld 110 performs a "net" data extraction from Server 130. The net changes contain only the changes in database 140 since the last synchronization, which are relevant to handheld 110. A full data extraction from server 130 contains a snapshot of database 140, which is relevant to handheld 110. A full data extraction is retrieved at processing block 216.

Flow continues to processing block 217, from both processing blocks 215 and 216, where handheld 110 completely rolls back transactions that occurred subsequent to the last synchronization.

At processing block 218, handheld 110 imports the net changes downloaded to the device so that the local data model on sync client 111 reaches the same state as that of database 140.

Flow continues to processing block 219 where handheld 110 logs off server 130 and the direct server sync process completes at stop block 299.

All request are sent between handheld 110 and server 130 using HTTP. Parameters passed from handheld 110 so server 130 may use HTTP post parameters, such as username and pass word for logging-in, paced transactions, application names and sync filters.

Figure 3:
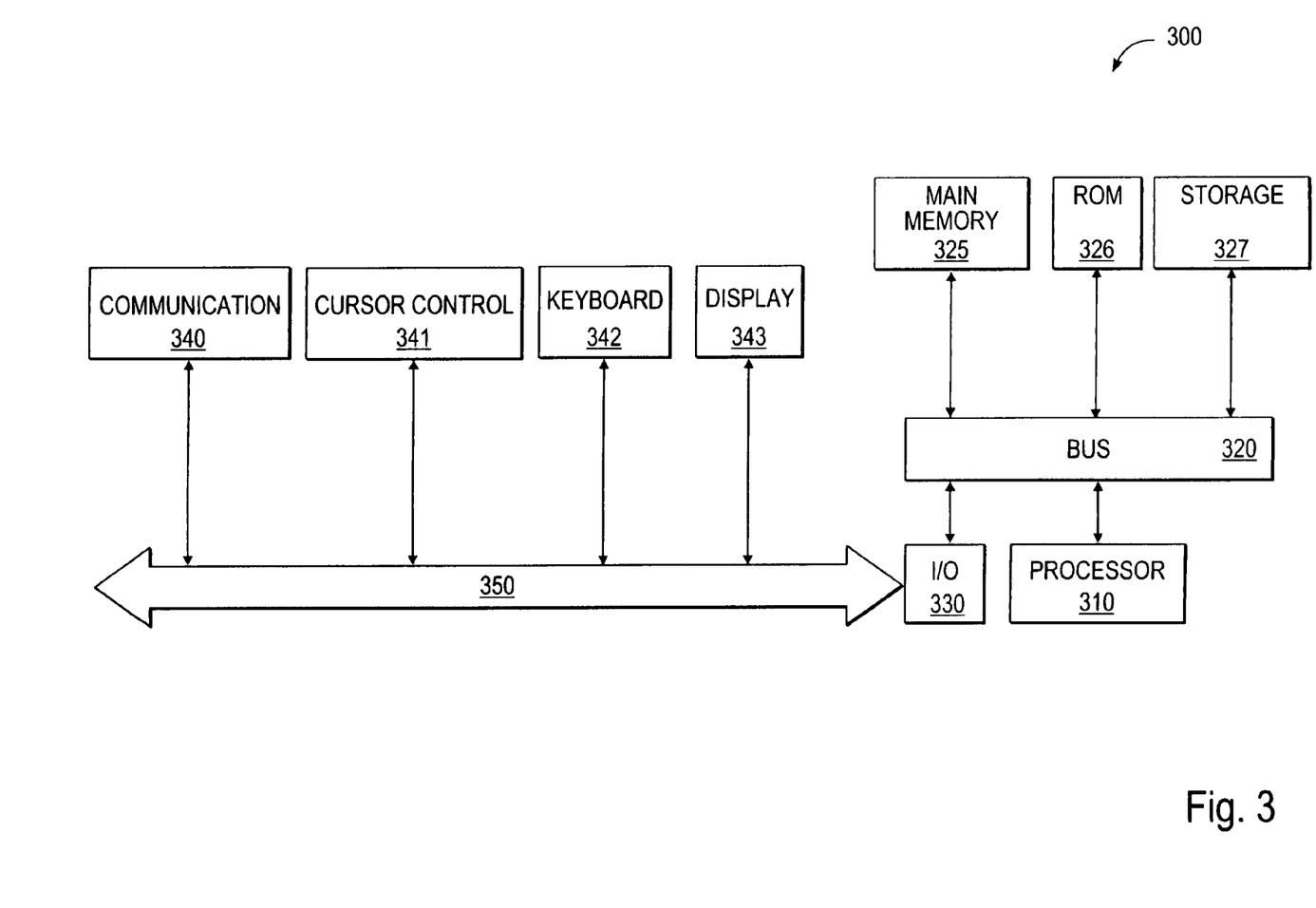
FIG. 3 illustrates a computer system 300 representing an integrated multi-processor, in which elements of the present invention may be implemented.

FIG. 3 illustrates a computer system 300 representing an integrated multi-processor, in which elements of the present invention may be implemented. For example, system 300 may be the architecture of server 130, companion PC 150 or handheld 110. One embodiment of computer system 300 comprises a system bus 320 for communicating information, and a processor 310 coupled to bus 320 for processing information. Computer system 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Computer system 300 also may include a read only memory (ROM) and/or other static storage device 326 coupled to bus 320 for storing static information and instructions used by processor 310.

A data storage device 327 such as a magnetic disk or optical disc and its corresponding drive may also be coupled to computer system 300 for storing information and instructions. Computer system 300 can also be coupled to a second I/O bus 350 via an I/O interface 330. A plurality of I/O devices may be coupled to I/O bus 350, including a display device 343, an input device (e.g., an alphanumeric input device 342 and/or a cursor control device 341).

The communication device 340 is for accessing other computers (servers or clients) via a network. The communication device 340 may comprise a modem, a network interface card, or other well known interface device, such as those used for coupling to Ethernet, token ring, or other types of networks.

A method and system for direct server synchronization with a handheld device is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

We claim:

1. A method comprising:
   comparing a first parameter with a second parameter obtained prior to the first parameter, the first and the second parameters being indicative of record extraction sequences; and
   extracting from a database one or more records that have been changed since a prior synchronization of first and the second computing devices if the first parameter matches the second parameter.

2. The method of claim 1, further comprising:
   retrieving the first parameter from the first computing device; and
   providing the first parameter to the second computing device via a computer system.

3. The method of claim 2, further comprising:
logging-in to the first computing device from the second computing device via the computer system, wherein the second computing device comprises a handheld device; and
retrieving a persistent node identification (ID) from the first computing device for the handheld device.

4. The method of claim 3, further comprising:
retrieving one or more views from the first computing device that are not already on the handheld device; and
retrieving one or more business objects from the first computing device that are not already on the handheld device.

5. The method of claim 4, wherein the first computing device comprises an enterprise server.

6. The method of claim 5, wherein
the persistent node identification (ID) is never reused, reassigned, or recycled,
the persistent node identification (ID) is stored in the handheld,
the views retrieved from the first computing device are stored in the handheld, and
the views retrieved from the first computing device are used to limit the amount of data transferred to the handheld.

7. A method comprising:
extracting a first record extraction sequence identification (ID) from a first computing device; and
extracting one or more records stored on a database that have been changed since a prior synchronization of the first computing device and a second computing device if the first record extraction sequence ID matches a second record extraction sequence ID that was obtained prior to the first record extraction sequence ID.

8. The method of claim 7, further comprising:
providing the extracted one or more records to the second computing device.

9. The method of claim 8, further comprising:
verifying the second computing device has a valid logon ID; and
providing a persistent node ID to the second computing device.

10. The method of claim 9, further comprising:
processing transactions on the first computing device; and
providing one or more events to the second computing device that are not already on the second computing device.

11. The method of claim 10, further comprising:
providing a personal digital assistant (PDA) repository associated with the second computing device to the second computing device.

12. The method of claim 7, wherein the second computing device comprises a handheld device.

13. A system comprising:
means for determining whether to extract records stored on a database that have been changed since a prior synchronization of first and the second computing devices by comparing first and second parameters, each of which is indicative of a record extraction sequence;
means for extracting one or more records if the first and second parameters compare equally.

14. A system comprising:
a companion device;
a first computing device communicably coupled to the companion device; and
a second computing device communicably coupled to the companion device, the second computing device comprising a circuit for determining whether to synchronize the first and second computing devices by comparing first and second parameters, which are indicative of record extraction sequences.

15. The system of claim 14, further comprising:
a database communicably coupled to the first computing device to store records, wherein the first and second parameters are used to determine whether one or more records in the database have been changed since a prior synchronization of the first and the second computing devices.

16. The system of claim 15, wherein the first computing device comprises an enterprise server and the second computing device comprises a handheld device.

17. The system of claim 16, further comprising a personal digital assistant (PDA) repository associated with the handheld device.

18. A machine-readable medium that includes instructions that, when executed, will perform operations comprising:
comparing a first parameter with a second parameter obtained prior to the first parameter, the first and the second parameters being indicative of record extraction sequences; and
extracting from a database one or more records that have been changed since a prior synchronization of first and the second computing devices if the first parameter matches the second parameter.

19. The machine-readable medium of claim 18, wherein the operations further comprise:
providing the one or more records extracted to the second computing device via a companion device.

20. The system of claim 19, wherein the operations further comprise:
providing a personal digital assistant (PDA) repository associated with the second computing device to the second computing device.

* * * * *

UNITED STATES PATENT AND TRADEMARK OFFICE
CERTIFICATE OF CORRECTION

PATENT NO. : 7,464,186 B2
APPLICATION NO. : 10/982649
DATED : December 9, 2008
INVENTOR(S) : Huang et al.

It is certified that error appears in the above-identified patent and that said Letters Patent is hereby corrected as shown below:

On the Title page, in Item (57), in column 2, under "Abstract", line 1, before "A" delete "The".

In column 4, line 35, after "interface" insert -- ; --.

In column 5, line 5, delete "111," and insert -- 111; --, therefor.

In column 5, line 58, delete "50." and insert -- 150. --, therefor.

Signed and Sealed this

Seventeenth Day of August, 2010

David J. Kappos
*Director of the United States Patent and Trademark Office*